United States Patent
Levin

(10) Patent No.: US 7,681,847 B2
(45) Date of Patent: Mar. 23, 2010

(54) PORTABLE DEVICE AND METHOD FOR RAISING THE HEIGHT OF FURNITURE

(75) Inventor: Amir Levin, Atlanta, GA (US)

(73) Assignee: Kabo, Inc., Atlanta, GA (US)

( * ) Notice: Subject to any disclaimer, the term of this patent is extended or adjusted under 35 U.S.C. 154(b) by 13 days.

(21) Appl. No.: 11/691,218

(22) Filed: Mar. 26, 2007

(65) Prior Publication Data

US 2007/0221800 A1    Sep. 27, 2007

Related U.S. Application Data

(60) Provisional application No. 60/890,353, filed on Feb. 16, 2007, provisional application No. 60/786,423, filed on Mar. 27, 2006.

(51) Int. Cl.
*F16M 11/21* (2006.01)

(52) U.S. Cl. .............................. 248/188.2; 248/346.01; 248/188.6; 248/188.5

(58) Field of Classification Search .............. 248/188.2, 248/346.1, 188.5, 188.6, 188.8, 688, 346.01; 297/345; 108/115, 128, 144
See application file for complete search history.

(56) References Cited

U.S. PATENT DOCUMENTS 878,043 A * 2/1908 Chrisman .................. 248/616

(Continued)

FOREIGN PATENT DOCUMENTS

FR    2 794 628    12/2000

(Continued)

OTHER PUBLICATIONS

Litaf's "High Leg" product description. http://www.litaf.com/web/inner.asp?cat=gallery&catId=1&info=36 (Retrieved on Oct. 1, 2007).

(Continued)

*Primary Examiner*—J. Allen Shriver
*Assistant Examiner*—Todd M. Epps
(74) *Attorney, Agent, or Firm*—Pabst Patent Group LLP

(57) ABSTRACT

The furniture raising device described herein is collapsible, portable, stable, and easy to use. The device is designed to raise furniture to one or two preset increases in height. Preferably the device is used to raise the height of a chair. In one embodiment, the device contains a plurality of arms and a center base, where each arm is pivotably attached at a predetermined point in the base using a pin. The locations for attachment of the pins are selected to be spaced far enough apart from each other to allow the arms to rotate about the pins from a first position, where the arms align with the legs in the article of furniture, to a second position, where the arms are aligned in the same general direction (i.e. the "storage position"), and to maximize the ability of the device to be as compact as possible in the storage position. In a second embodiment, the device contains a plurality of arms and a center base, where each arm is pivotably and slidably attached to the base using a pin. In a third embodiment, the furniture raising device is designed to increase the device's strength and prevent breakage. In this embodiment, at least one portion of the center base either contacts the floor when the device is in use or hovers above the floor by at least approximately 1 mm.

11 Claims, 11 Drawing Sheets

U.S. PATENT DOCUMENTS

| | | | | |
|---|---|---|---|---|
| 3,952,983 | A | * | 4/1976 | Crochet .................. 248/173 |
| 5,060,896 | A | * | 10/1991 | Hobbins ................ 248/188.2 |
| 5,333,825 | A | * | 8/1994 | Christensen .......... 248/188.2 |
| 5,899,422 | A | * | 5/1999 | Eke ...................... 248/188.4 |
| 6,892,991 | B1 | * | 5/2005 | Soh ....................... 248/188.2 |
| D548,056 | S | * | 8/2007 | Erickson et al. ............ D8/354 |
| 2006/0075565 | A1 | * | 4/2006 | Agre et al. .................... 5/660 |

FOREIGN PATENT DOCUMENTS

WO     WO 88/08682     11/1988

OTHER PUBLICATIONS

Cheeky Rascal's "BabyTall" product description. http://www.cheekyrascals.co.uk/handysitt/accessories.html (Retrieved on October 1, 2007).

* cited by examiner

FIG. 11A
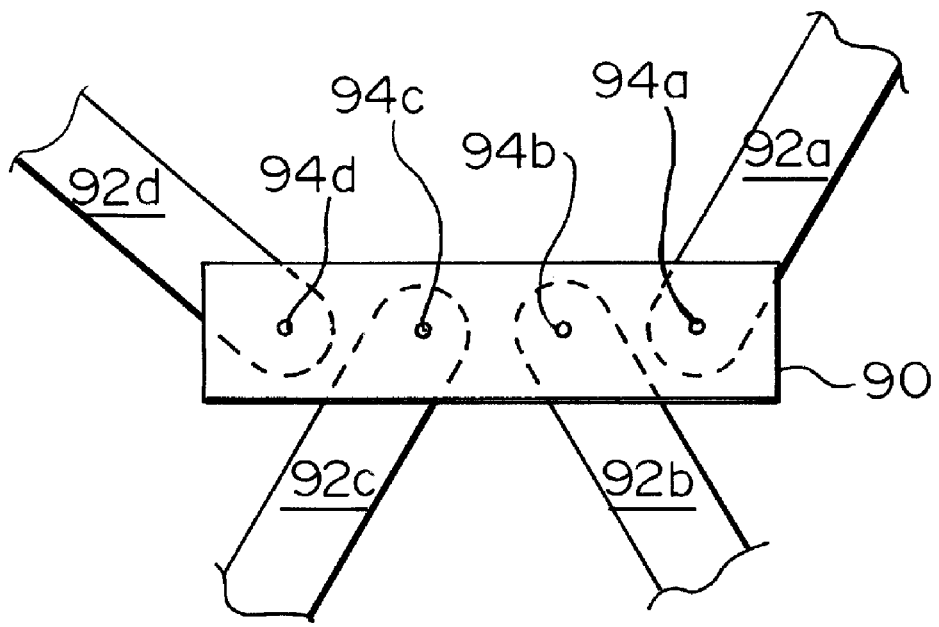
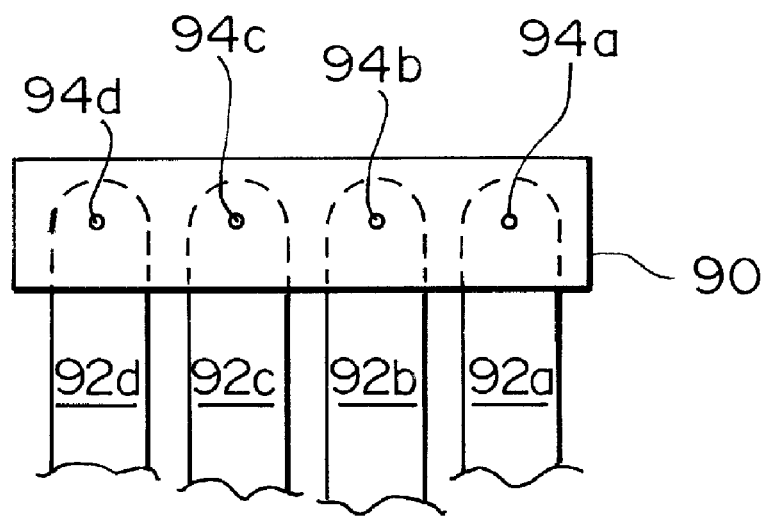
FIG. 11B

PORTABLE DEVICE AND METHOD FOR RAISING THE HEIGHT OF FURNITURE

CROSS-REFERENCE TO RELATED APPLICATIONS

This application claims priority to U.S. Ser. No. 60/890,353, filed Feb. 16, 2007 and U.S. Ser. No. 60/786,423, filed Mar. 27, 2006.

FIELD OF THE INVENTION

The present invention is in the field of improved devices for raising the height of furniture, particularly chairs.

BACKGROUND OF THE INVENTION

Standard chairs are generally too short to allow for children to sit and reach a table during meal time without an aid, such as a cushion, book, or booster seat. Additionally, people who are suffering from arthritis generally have difficulty and experience pain when getting into an out of chairs. Such individuals could more easily and comfortably sit if the height of the chair was raised. However, such aids generally cause greater instability in the chair, often creating safety hazards. For example, when a booster seat is placed on a chair, the child in the booster seat is sitting in a chair that is less stable than that same chair without the booster seat. This is because the center of gravity of the chair has been raised and the chair has now become less stable. Also, frequently one or more of these aids are not available.

A number of different devices for raising the height of chairs have been described, however these devices are generally cumbersome to travel with and/or use.

WO 88/08682 to Hobbins discloses a system for raising a chair, which contains four separate leg extenders. Thus to use this system, a user must separately place each of the four extenders on a leg and separately adjust each extender so that all of the extenders are at the same height.

FR 2 794 628 to Clement discloses a device for raising the height of a chair that contains a plate with spikes, allowing for several plates to be piled upon each other, and holes for retaining straps to secure the plates together. U.S. Pat. No. 5,333,825 to Christensen discloses a device for raising the height of a chair that contains a plurality of adjustable arms, a top plate and a bottom plate. Both of these systems are large and difficult to travel with.

U.S. Pat. No. 3,952,983 to Crochet discloses a portable device of raising a chair. However, this device is cumbersome to travel with as it is quite long in its "collapsed" position. Additionally, this device can break easily if a force is applied to the center of the device, such as by being stepped on by an adult.

"BABY TALL" is the tradename for a chair boosting device currently sold in Europe, Israel and Australia. A similar device is also sold in Israel by Litaf under the tradename "HIGH LEG". Like the device described in U.S. Pat. No. 3,952,983 to Crochet, the BABY TALL and HIGH LEG devices are cumbersome to travel with as they are quite long in the "collapsed" position. Further, these devices break easily when stepped on.

Therefore there is a need for improved, portable devices for raising the height of legged furniture, particularly chairs.

It is an object of the invention to provide improved, portable devices for raising the height of legged furniture.

It is a further object of the invention to provide improved methods for raising the height of legged furniture.

SUMMARY OF THE INVENTION

The furniture raising device described herein is collapsible, portable, stable, and easy to use. The device is designed to raise furniture to one or two preset increases in height, i.e. height positions. Preferably the device is used to raise the height of a chair. In one embodiment, the device contains a plurality of arms and a center base, where each arm is pivotably attached at a predetermined point in the base using a pin. The locations for attachment of the pins are selected to be spaced far enough apart from each other to allow the arms to rotate about the pins from a first position, where the arms align with the legs in the article of furniture, to a second position, where the arms are aligned in the same general direction (i.e. the "storage position"), and to maximize the ability of the device to be as compact as possible in the storage position. In a second embodiment, the device contains a plurality of arms and a center base, where each arm is pivotably and slidably attached to the base using a pin. As the pin slides and rotates in the groove, the corresponding arm is also able to slide and rotate. Thus the arms rotate about the pin and slide around the groove until each arm generally aligns with each leg of the article of furniture. To store the device, the arms rotate and slide until the arms are aligned in the same general direction (i.e. the "storage position"). The arms contain a pedestal at the distal end, which is designed with a seat for the placement of the leg of the article of furniture. The design of the pedestal is selected to maximize the stability of the device, while providing the most compact design for the device in the storage position. In a third embodiment, the furniture raising device is designed to increase the device's strength and prevent breakage. In this embodiment, the furniture raising device contains a center base that serves as a support mechanism. At least one portion of the center base either contacts the floor when the device is in use or hovers above the floor by at least approximately 1 mm.

BRIEF DESCRIPTION OF THE DRAWINGS

FIGS. 11A and 11B are a plan views of a third embodiment of the furniture raising device. FIG. 11A shows the arms in a position for alignment with legs of an article of furniture. FIG. 11B shows the arms in the storage position.

DETAILED DESCRIPTION OF THE INVENTION

I. Furniture Raising Device

Figure 1:
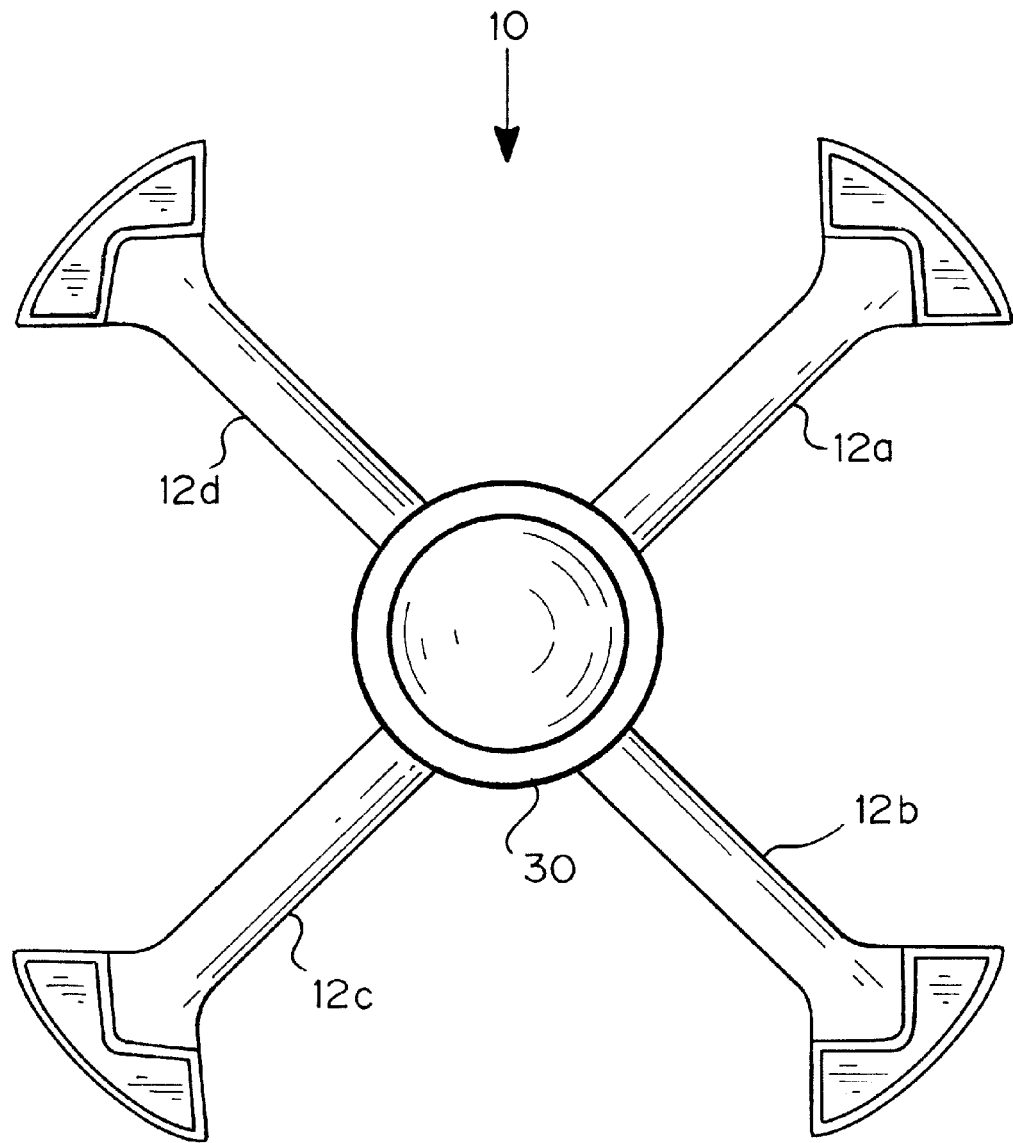
FIG. 1 is a plan view of one embodiment of the furniture raising device in a position for alignment with legs of an article of furniture.

The furniture raising device described herein is collapsible, portable, stable, and easy to use. In one embodiment the device is designed to raise furniture to one preset increase in height. In a preferred embodiment, the device is designed to raise an article of furniture to two different preset increases in height. The device can be used to raise the height of legged articles of furniture, such as chairs, stools, benches, tables, and desks. In the preferred embodiment, the device is designed to raise the height of a four-legged article of furniture. In the most preferred embodiment, illustrated in the attached Figures, the device is designed to raise the height of a chair. The furniture raising device may be formed from any non-toxic material. In the preferred embodiment, it is formed from a plastic, preferably a light weight, durable plastic, such as nylon, High Impact Polystyrene (HIPS), Acrylonitrile Butadiene Styrene (ABS) or polypropylene (PP), or blends or copolymers thereof.

The device contains a plurality of arms, where the number of arms is equal to the number of legs on the article of legged furniture to be raised, preferably the device contains four arms. As shown in the figures, each arm (12) is pivotably attached to a center base (30) at its proximal end (16). In one embodiment, each arm is attached to the center base by a pin (20), which fits through a hole (22) at the proximal end (16) of the arm (12) and attaches to the center base (30) (see FIGS. 2 and 4). In one embodiment (not shown in figures), the pin is formed by a connecting two tubular materials each of which is connected to the center base. In another embodiment, each arm is attached to the center base (30) using a pin (20), which is attached to the proximal end (16) of the arm (12) and fits inside a groove (39) in the center base (30) (see FIGS. 9 and 10).

As used herein, "pivotably attached" means the arm can rotate about the pin. In some embodiments, the arm may be able to rotate up to about 270° about the pin, while in other embodiments, the ability of one arm to rotate is hindered by the placement of the other arms. At a minimum, the arm is able to rotate about the pin from a radially outward position, relative to the center base, to a storage position, where all of the arms are generally aligned in the same direction.

a. Arms

The device contains a plurality of arms, where the number of arms is equal to the number of legs on the article of legged furniture to be raised. In the preferred embodiment, the device contains four arms (12a-d).

1. Tubular Beam(s)

Each arm contains at least one tubular beam. Although the tubular beam depicted in the Figures is in the shape of a cuboid tube, the tubular beam may have any suitable shape, with the preferred shape being cylindrical or cuboid.

In one embodiment, each arm contains a plurality of tubular sections, where each section fits into a section adjacent to it except for the last section located at either the proximal end attached to the center base or located at the distal end attached to a pedestal (i.e., the first section fits inside a second section, which fits inside a third section, and so on). This embodiment is also referred to herein as a "telescoping arm". The telescoping arm contains at least two sections, and may contain more than two sections. In one embodiment, the section attached to the center base is the widest section and the section attached to the pedestal is the narrowest section. In another embodiment, the section attached to the center base is the narrowest section and the section attached to the pedestal is the widest section. A telescoping arm reaches its greatest length in its extended position, and reaches its shortest length in its contracted position.

In the preferred embodiment, which is particularly useful for raising the heights of a chair, each arm contains two tubular sections, where one section is narrower, i.e. has a smaller width, than the other section and fits inside the other section. In this embodiment, the length of the arm in its contracted position is about half of the length of the arm when it is in its extended position. In one embodiment, illustrated in the Figures, the first section (18a) is narrower than the second section (18b) and fits inside the second section (18b). In a preferred embodiment, the first section (18a) is longer than the second section (18b). Preferably the first section (18a) has a length ranging from approximately 4 inches to approximately 15 inches, preferably from approximately 6 inches to approximately 10 inches, most preferably the length is about 8 inches. Preferably the second section (18b) has a length ranging from approximately 4 inches to approximately 15 inches, preferably from approximately 6 inches to approximately 10 inches, more preferably from approximately 5 inches to approximately 9 inches, and most preferably the length is approximately 7 inches. In another embodiment, the first and second sections have the same length; alternatively the second section (18b) is longer than the first section (18a).

Figure 2:
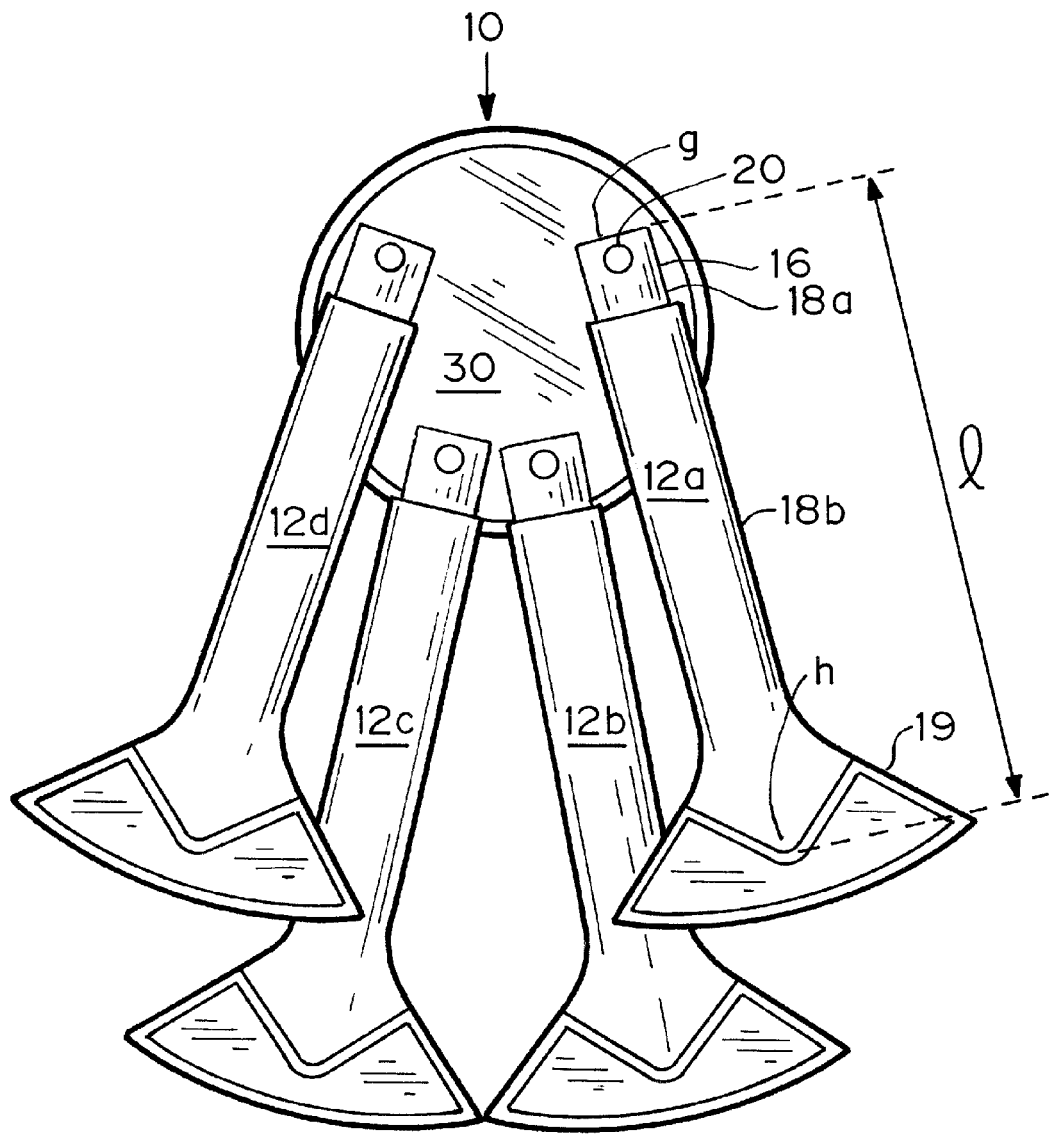
FIG. 2 is a plan view of one embodiment of the furniture raising device in the storage position.
Figure 9:
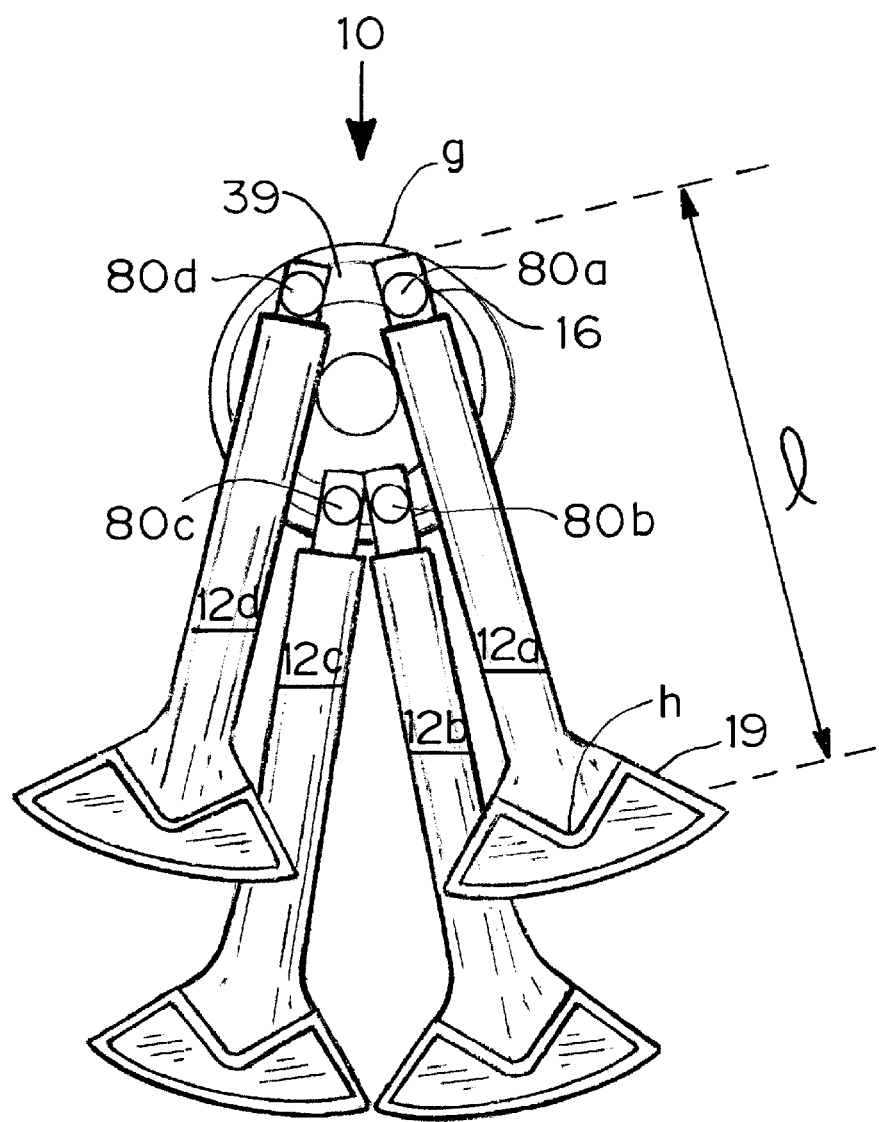
FIG. 9 is a plan view of a second embodiment of the furniture raising device in the storage position.

In a preferred embodiment, which is particularly useful for raising the heights of a chair, the length (1) of the arm ranges from about 10 inches to about 18 inches, preferably from about 12 inches to about 17 inches, most preferably about 16 inches, when the arm is in its extended position, when measured from the edge (g) of the proximal end of the arm (12) to the point (h) where the corner (52) meets the seat (54) (see FIGS. 2 and 9 for locations for "g" and "h").

Figure 3:
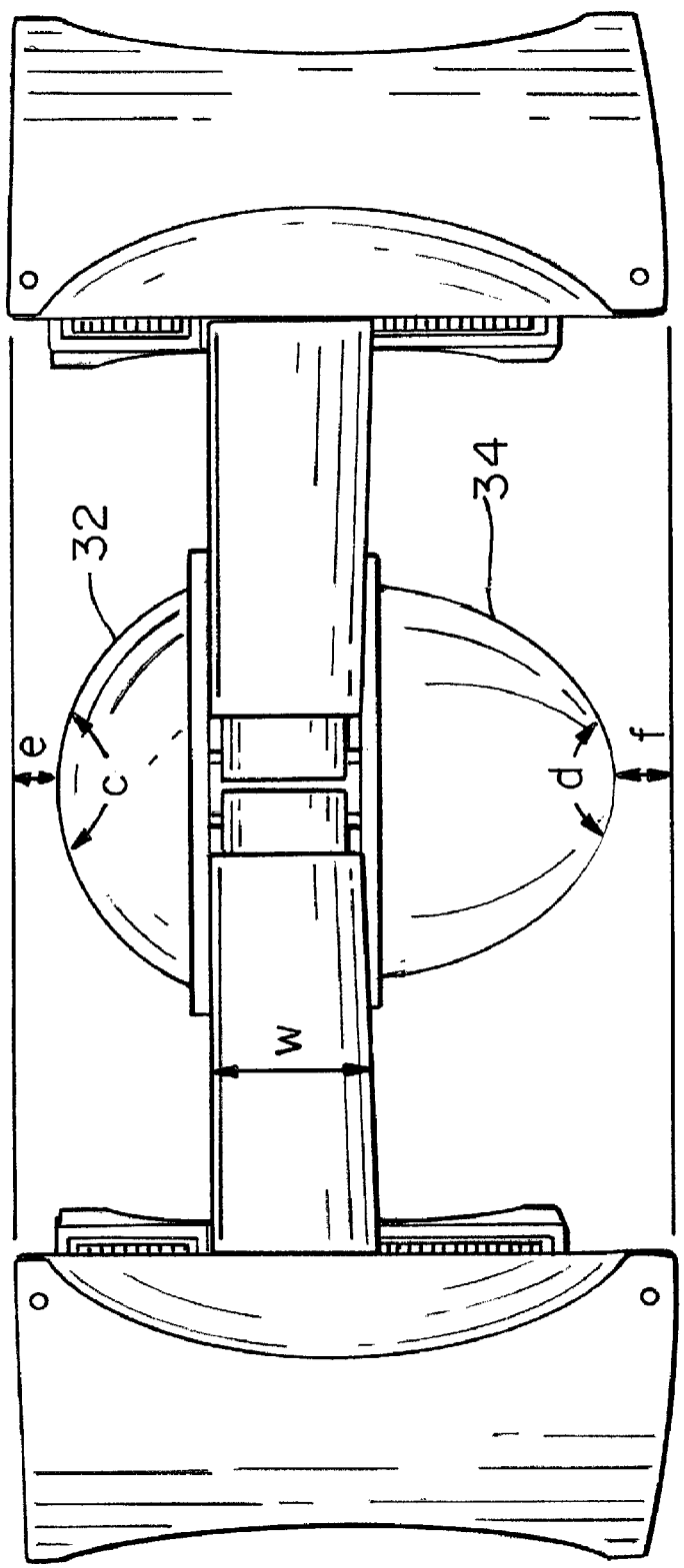
FIG. 3 is a side view of one embodiment of the furniture raising device in a position for alignment with legs of an article of furniture, with the arms in the contracted position.

As used herein the "width" (w) of the arm refers to the greatest width of all of the sections in the arm (see FIG. 3).

2. Pedestal

The distal end (19) of each arm is connected to a pedestal (50). The pedestal extends in a generally perpendicular direction relative to the arm. The pedestal (50) mates with the distal end (19) of the arm and forms on each side of the arm a corner (52) and a seat (54) upon which the leg of an article of furniture can rest. The corner (52) and/or seat (54) are preferably formed of or covered with a material that has a greater coefficient of friction than the material used to form the device, which allows the corner and/or seat to provide a firmer grip on the chair as well as protect the chair leg from being scratched or damaged. Suitable materials include rubber and plastic. In the most preferred embodiment, the corner (52) is formed of or covered with a material that has a greater coefficient of friction than the material used to form the device. In the preferred embodiment the material has a texture, with raised and lowered areas. For example, a rubber material can cover the corner and/or the seat, thereby reducing the likelihood that the leg of a chair will slip out of the corner after it is placed in the device as well as protecting the chair leg from being scratched or damaged.

Figure 4:
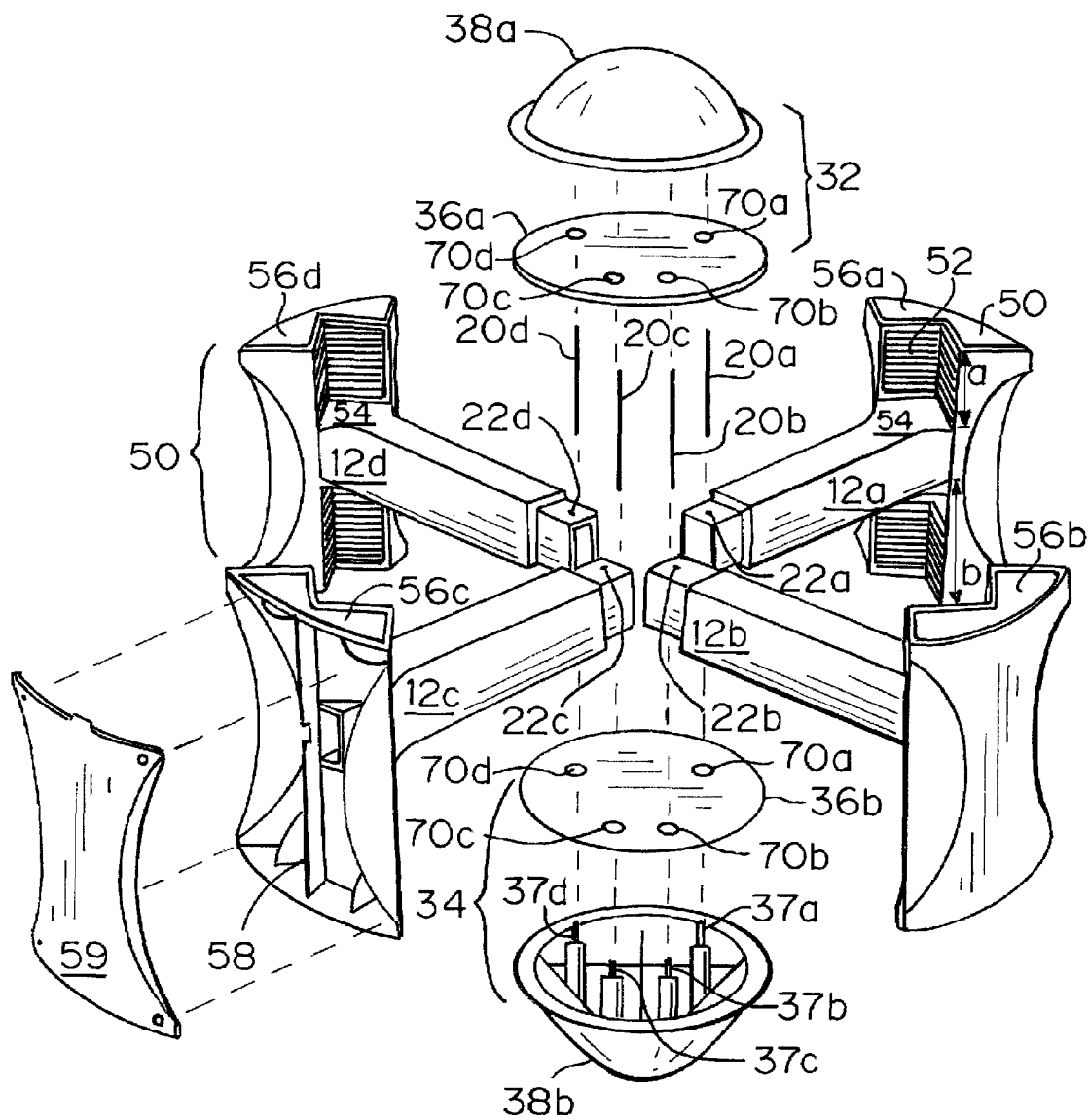
FIG. 4 is a perspective view showing the components of one embodiment of the furniture raising device with the arms in the contracted position.
Figure 5:
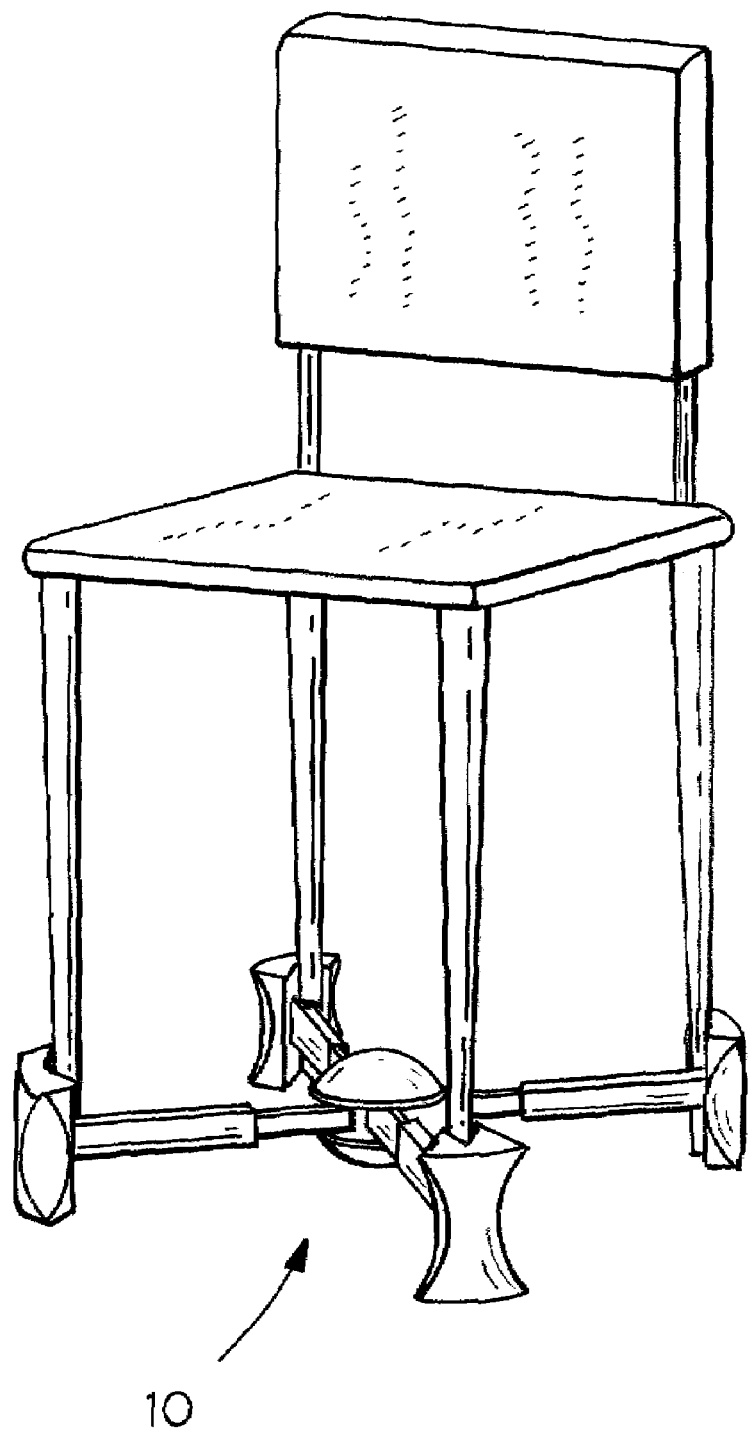
FIG. 5 is a perspective view of the furniture raising device attached to a chair.
Figure 6C:
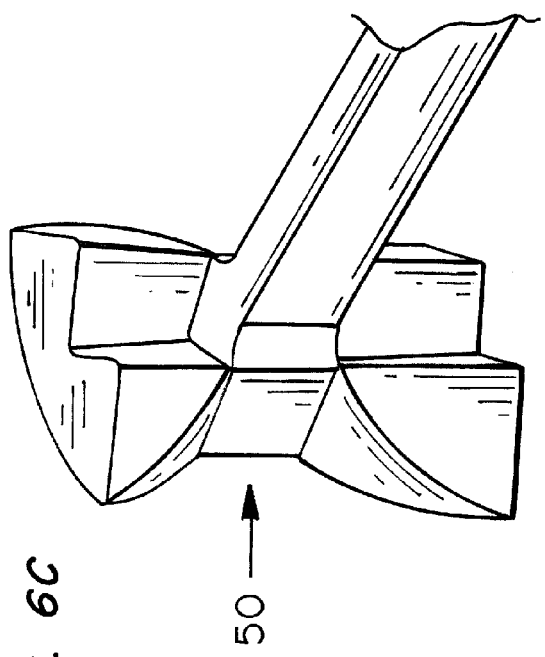
FIGS. 6A, 6B and 6C are perspective views on an enlarged scale of three different designs for the pedestal.
Figure 6B:
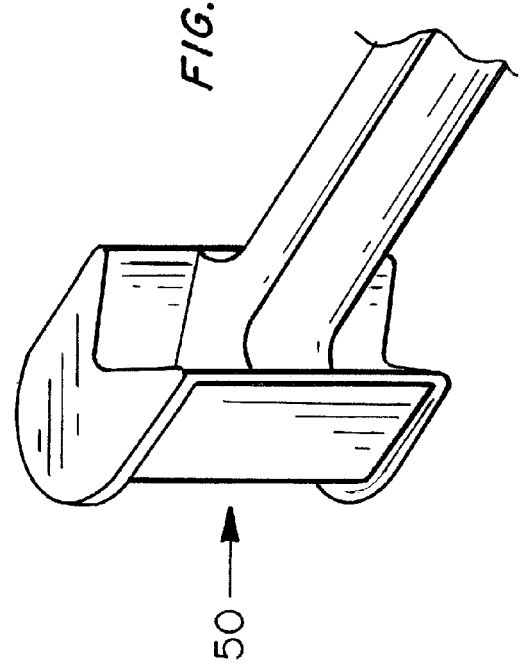
Figure 6A:
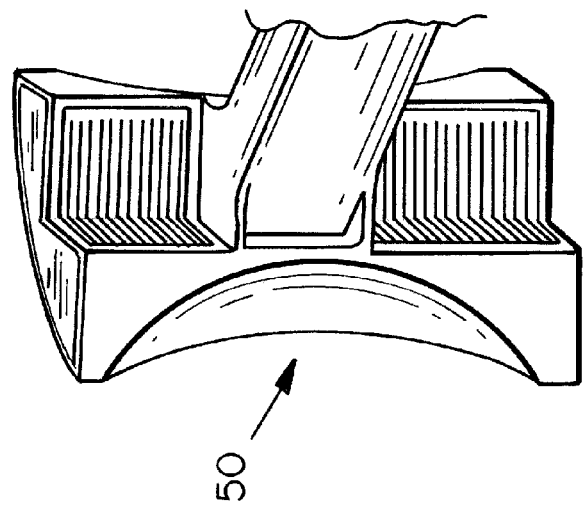

The pedestal can have any suitable shape and size. Exemplary shapes and designs are provided in the Figures. For example, the pedestal can have a convex shape along each of its sides that curves inwardly toward the arm, such as shown in FIGS. 3-5, 6A, and 10. Another example is shown in FIG. 6B, where the pedestal has a generally ovular shape. Yet another example is shown in FIG. 6C, where the pedestal has the shape of a modified hourglass. Preferably the size and shape of the pedestal is selected to provide the greatest stability to the article of furniture, such as to prevent the article of furniture from tipping over, while providing the smallest dimensions, such as to prevent an individual from tripping over the pedestal. The shape of the pedestal is also selected to provide the most compact device, particularly when the device is in its storage position. In the preferred embodiment, the floor contact portion (56) has a general shape of two connected isosceles triangles with a rounded bottom, such as shown in FIGS. 6A and 6C. In the preferred embodiment the pedestal has a convex shape, which curves inwardly toward the arm, as shown in FIGS. 6A and 6C; this allows the pedestal to take up less space when the device is in its storage position than it would if the pedestal had a straight surface on its sides.

Optionally, a material that has a greater coefficient of friction than the material used to form the device also covers the floor contact portion (56) of the pedestal (50). This reduces the likelihood that device will slip after it is placed in contact with the floor and protects the floor from scratching or wear.

The pedestal can be designed to allow for two different chair raising heights or one chair raising height. As shown in FIG. 4, the length (a) between the seat (54) and the floor contact portion (56) on one side of the arm can be different than the length (b) on the other side of the arm. Alternatively these two lengths ("a" and "b") can be equal to each other. Thus, if the pedestal has two different lengths, when the legs of a piece of furniture are placed on the seats (56) on one side of the pedestal (50), the furniture will be raised by the length on the opposite side (e.g. "b") plus the width of the arm (w). However, if the device is turned over and the legs of the furniture are placed on the seats on the opposite side of the pedestal, the furniture will be raised by the length on the first side (e.g. "a") plus the width of the arm (w). In the preferred embodiment, the length (a or b) between the seat on either side of the arm (54) and the floor contact portion (56) ranges from about 3 inches to about 5 inches, more preferably from about 3.5 inches to about 4.5 inches. In one embodiment, the length between the seat on either side of the arm (54) and the floor contact portion (56) on one side of the arm is between 4 inches and 4.5 inches, and the length between the seat on either side of the arm (54) and the floor contact portion (56) on the opposite side of the arm is between 3 inches and 4 inches.

Optionally, each pedestal (50) can contain one or more hinges (not shown in figures) which allow the corner (52) to fold towards the seat (54) when the device is not in use, and to snap securely into place when the device is used to increase the height of an article of furniture.

3. Tension Creating Material

Each arm preferably contains a material inside the tubular beams that provides tension, such as a coiled spring or a rubber band. The tension creating material exerts a force tending to retract its respective arm to its contracted position. When each leg of a legged article of furniture, such as a chair, is placed in the seat of each arm, the retractive force applied by the tension creating material pulls on each leg of the article of furniture and secures the article in the device.

Figure 7:
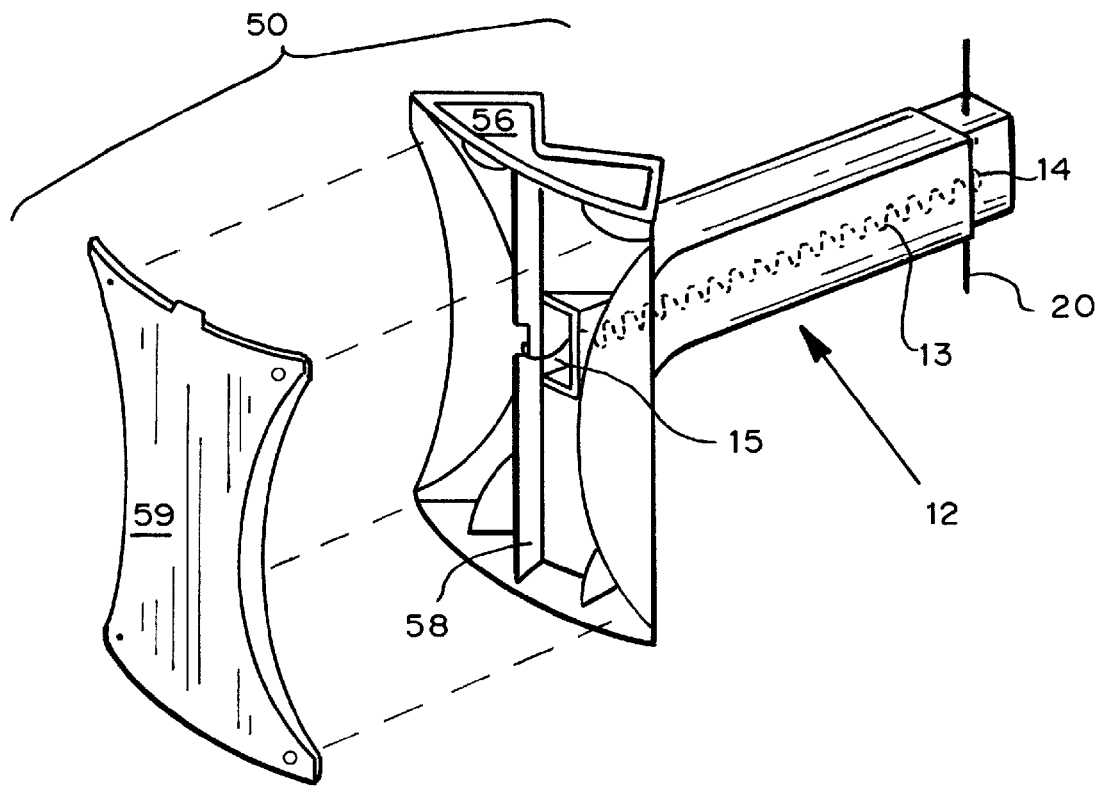
FIG. 7 is a perspective view of a partial furniture raising device, illustrating the relationship between the spring and the other elements in the arm in one embodiment.

In the preferred embodiment, illustrated in FIG. 7, each arm contains a coiled spring (13) inside the tubular beam(s). In one embodiment, the coiled spring attaches to the pin (20) at its proximal end (14) and to the pedestal (50) at its distal end (15) (see FIG. 7). As shown in FIG. 7, the spring (13) preferably hooks onto a support beam (58) inside the pedestal (50). The support beam is generally not visible to the user when the device is fully assembled and in use. The support beam is visible when the face plate (59) is removed. Alternatively, the coiled spring (13) attaches to the pin (20) at its proximal end (14) and to the proximal end of the last section of the tubular beam at the spring's distal end (15) (not shown in figures).

b. Center Base

The center base may have any suitable geometry. As shown in FIGS. 1-10, the center base preferably has a cross-sectional area in the shape of a circle. However, other geometries may be used as well, such as ovals, squares, rectangles, triangles, etc. For example, as shown in FIGS. 11A and 11B, the center base may be in the form of a rectangle.

Figure 10:
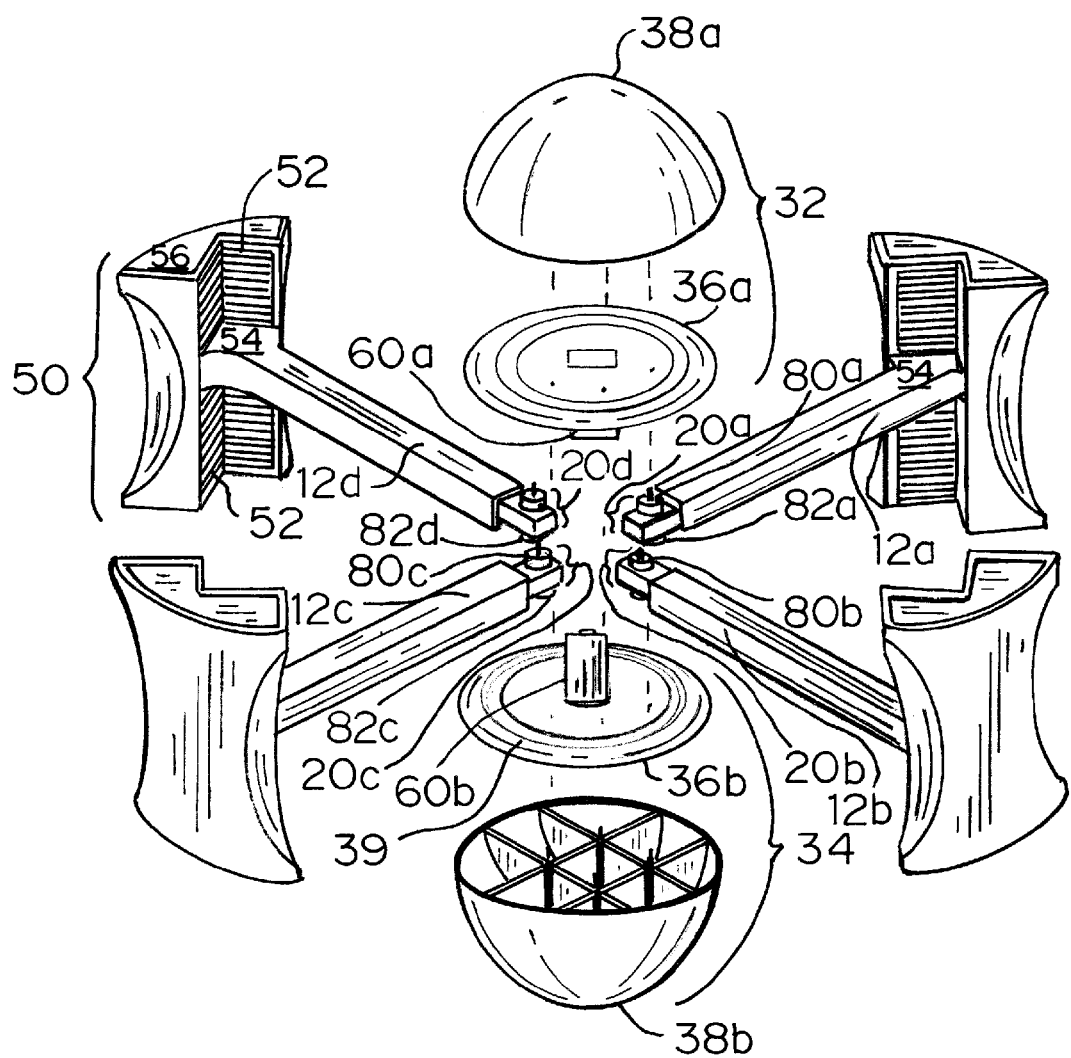
FIG. 10 is a perspective view showing the components of a second embodiment of the furniture raising device with the arms in the contracted position.

As shown in FIGS. 3, 4 and 10, the center base (30) is formed by joining a first portion (32) with a second portion (34). In one embodiment (not shown in figures), the first or second portion touch the floor when the device is placed on an article of furniture. In this embodiment, the section of the first or second portion that contacts the floor is preferably formed of or covered with a material that has a greater coefficient of friction than the material used to form the device, which protects the floor from being damaged or scratched. Preferably, neither the first portion (32) nor the second portion (34) touch the floor in the absence of the application of a downwardly applied force to the center base (30) when the device is used. However, if a force is applied to the center base (30), then the second portion (34) or first portion (32), whichever is closest to the floor, will touch the ground and thereby provide support to prevent the device from breaking.

In one embodiment, the first and second portions have the same shape and the same length, preferably both are dome-shaped (i.e. curved) and have approximately equal arc lengths. In another embodiment, the first and second portions have different arc lengths. For example, as shown in FIG. 3, the arc length (c) for the first portion (32) is less than the arc length (d) for the second portion (34). Additionally, the first portion (32) is shorter than the second portion (34). The distance (e) between the top of the first portion (32) and the floor when the device is oriented with the first portion (32) proximal to the floor is selected to be approximately equal to the distance (f) between the top of the second portion (34) and the floor, when the device is flipped and the second portion (34) is proximal to the floor. Thus if a force is applied to the center base (30), such as by an individual stepping on the center base (30), then the portion proximal to the floor will touch the floor and thereby provide support to prevent the device from breaking.

In the preferred embodiment, the distances (e) and (f) range from approximately 1 mm to approximately 4.5 cm, preferably from approximately from approximately 4 mm to approximately 15 mm, most preferably from approximately 5 mm to approximately 10 mm.

In one embodiment, each of the first and second portion contains a dome-shaped portion (38a or 38b). No cover or disc is included in the first and second portions in this embodiment. Optionally, the first and second portions also contain a disc (36a and 36b), which protects the dome-shaped portions from accumulating dirt and improves the overall appearance of the device.

1. Dome-shaped Portion with Pin Holders

As shown in FIG. 4, the dome-shaped portion (38a and 38b) contains a plurality of pin holders (37a, b, c, and d). The number of pin holders (37a, b, c, and d) corresponds with the number of arms. Preferably, the disc contains pin holders. As shown in FIG. 4, pins (20a, b, c, and d) connect the arms to the center base (30) by passing through the hole (22a, 22b, 22c, and 22d) in the proximal end (16) of each arm (12a, b, c, and d) and fitting into the pin holders (37a, b, c, and d) in each dome-shaped portion (38a and 38b).

In one embodiment (not shown in figures) separate pins and pin holders are not required as each pin is formed by connecting two tubular materials each of which are connected to the center base. The tubular materials may be connected to each other by any suitable means, such as by a snap fit, lock and key mechanism, etc.

The pin holders (37a, b, c, and d) are placed in the dome-shaped portion (38a and 38b) so that they are spaced far enough apart from each other to allow the arms to rotate about the pins from a first position, shown in FIG. 1, where the arms align with the legs in the article of furniture, to a second position, shown in FIG. 2, where the arms are aligned in the same general direction. The second position is referred to herein as the "storage position". The location of the pin holders (37a, b, c, and d), and thus the location of the arms and pins which attach to the pin holders, is selected to maximize the ability of the device to be as compact as possible in the storage position. The location of the pin holders is also a function of the geometry of the center base.

Thus, in the preferred embodiment, the pin holders (37b and 37c) for the innermost arms (12b and 12c) are closer to each other than the pin holders (37a and 37d) for the outermost arms (12a and 12d), i.e. the straight line joining 37c to 37b, referred to herein as the "minor line", is shorter than the length of the straight line joining 37d to 37a, referred to herein as the "major line". This arrangement is preferred when the cross-sectional area of the center base is in the shape of a circle or a similarly configured shape. In the preferred embodiment the ratio of minor line to the major line ranges from 1:1.1 to 1:5, more preferably from 1:2 to 1:4, most preferably the ratio of minor line to the major line is 1:3.

In another preferred embodiment, such as when the cross-sectional area of the center base (90) is in the shape of a rectangle or a similarly configured shape, as shown in FIGS. 11A and 11B, the pin holders (not shown in FIGS. 11A and 11B) are generally located in a straight line and are generally equidistant apart. The pin holders are spaced far enough apart from each other to allow the arms (92a, b, c, and d) to rotate about the pins (94a, b, c, and d) from a first position, shown in FIG. 11A, where the arms align with the legs in the article of furniture, to a second position, shown in FIG. 11B, where the arms are aligned in the same general direction, i.e. the storage position.

Optionally, the center base (30) also contains a flat disc (see FIG. 4). In this embodiment, the disc contains a plurality of holes; and the flat discs in each of the first and second portions are identical. The number and placement of the holes (70a, b, c, and d) corresponds with the number and placement of the pin holders (37a, b, c, and d). If the center base (30), contains a flat disc, the device (10) is assembled as shown in FIG. 4, where the pins (20a, b, c, and d) connect the arms to the center base (30) by passing through the holes (22a, 22b, 22c, and 22d) in the proximal end (16) of each arm (12a, b, c, and d), then they pass through the holes (70a, b, c, and d) of the disc (36a and 36b) and into the pin holders (37a, b, c, and d) in each dome-shaped or egg-shaped portion (38a and 38b).

2. Dome-shaped Portion with Disc with Groove

Figure 8:
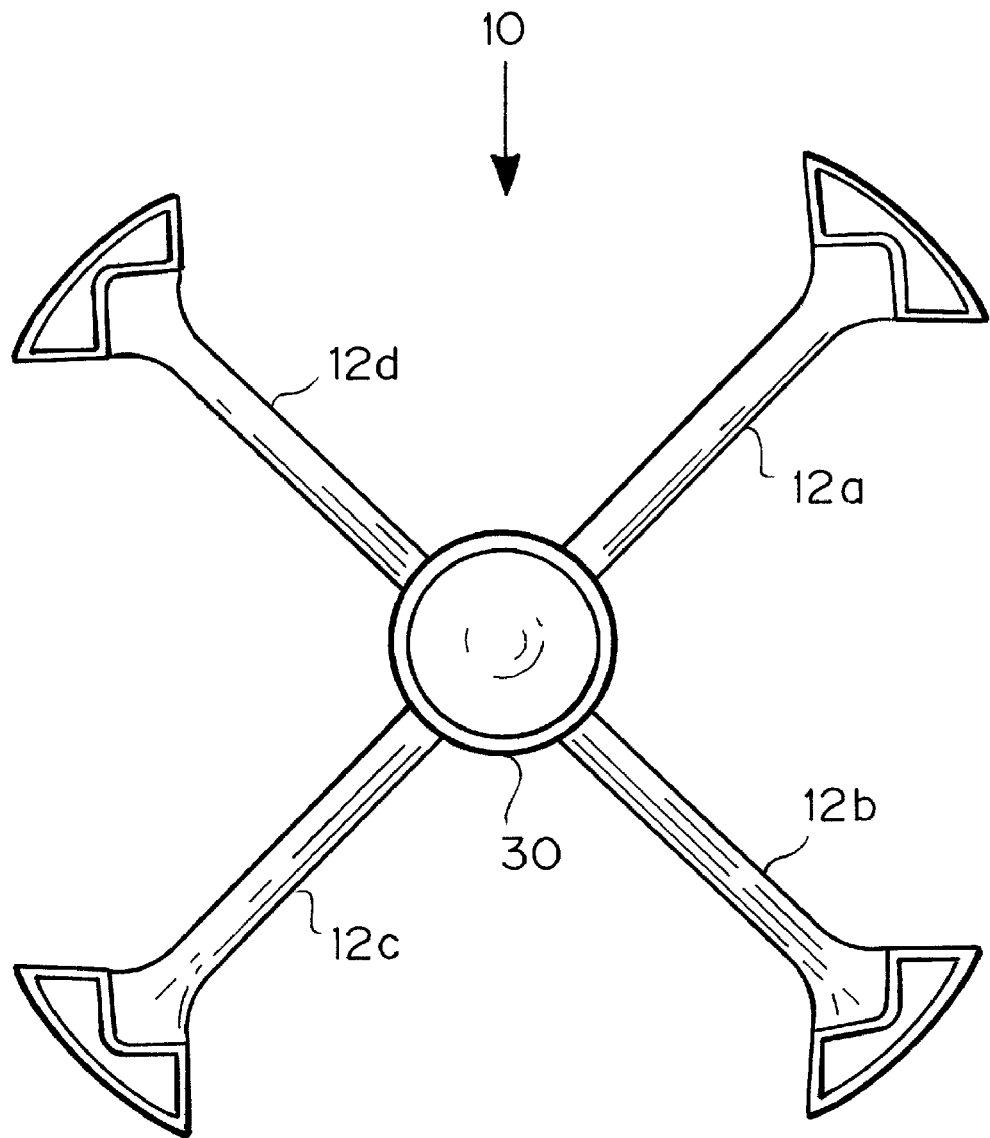
FIG. 8 is a plan view of a second embodiment of the furniture raising device in a position for alignment with legs of an article of furniture.

In a second embodiment, shown in FIGS. 8-10, the device contains a center base (30) formed of a first portion (32) and a second portion (34), where each of the first and the second portions contain a dome-shaped portion (38a and 38b) and a flat disc (36a and 36b) with a circular groove (39) (see FIG. 10). In this embodiment, the discs also contain a means for attaching the two discs to each other. Any suitable means for attaching the discs may be used; by way of example, suitable means for attachment include nuts and a bolt; an attachment member on one disc that attaches to a corresponding area on the other disc, such as by a lock and key mechanism, with a screw, or a snap fit; and a column located near the center of each disc (60a and 60b) and oriented perpendicular to the disc which mates with a corresponding area on the opposite disc.

In this embodiment, the pins (20a, b, c, and d) have a wider diameter at each end ((80a, b, c, and d) and (82a, b, c, and d)) of the pin and a narrower diameter along the length of the pin. This allows the pins to fit inside the groove and prevents the pins from falling out of the groove.

The groove is designed to contain the pins and prevent them from falling out. The depth of the groove is sufficiently deep to allow one end ((80a, b, c, and d) or (82a, b, c, and d)) of each pin (20a, b, c, and d) to fit inside the groove. Thus, when the device is assembled, the ends of the pins (20a, b, c, and d) fit inside and slide along the groove (39) in each of the discs. The top of the groove is narrower than the bottom of the groove, to ensure that the ends of the pins remain inside the groove.

Optionally, a lubricant is placed along the groove to ensure that the ends of the pins slide smoothly along the groove.

II. Uses for the Furniture Raising Device

The furniture raising device disclosed herein can be used with to raise the height of legged articles of furniture, such as chairs, stools, benches, tables, and desks. In the preferred embodiment, the device is designed to raise the height of a four-legged article of furniture. In the most preferred embodiment, the device is used to raise the height of a chair.

During storage and travel, the furniture raising device is typically placed in its storage position, i.e. where the arms are generally aligned with respect to each other, as shown in FIGS. 2, 9 and 11B). This reduces the height of the device and allows for it to be more easily carried. Preferably the device fits inside standard-sized travel bags when in its storage position.

To use the device to raise the height of an article of furniture, an individual merely rotates the arms of the device so that they generally align with each of the legs on the article of furniture. For the embodiment in which each disc (36a and 36b) contains a groove (39), in addition to rotating the arms, the user also slides the arms around the groove, until each arm generally aligns with each leg of the article of furniture (see e.g. FIG. 8). Then the user extends each of the arms, one at a time, by pulling on the pedestal (50) until the leg of the article aligns with the seat (54) of the pedestal. When each leg of a legged article of furniture, such as a chair, is placed in the seat of each arm, the retractive force applied by the spring pulls on each leg of the article of furniture and secures the placement of article in the device. FIG. 5 shows the device in use with a chair. When used with a chair, one should be able to move the chair, while the device remains in place on the chair.

The device is removed from the article by removing each arm from each leg of the device. Typically, an individual will pull on the pedestal (50) to remove it from the leg of the article, while lifting the leg out of the seat (54). Then the spring (13) pulls the arm back into its contracted position. This allows for the easy removal of the remaining legs from the device.

Those skilled in the art will recognize, or be able to ascertain using no more than routine experimentation, many equivalents to the specific embodiments of the invention described herein. Such equivalents are intended to be encompassed by the following claims.

I claim:

1. A device for raising the height of a legged article of furniture, comprising four arms, four pins and a center base, wherein each arm comprises at least one tubular beam, a tension creating material, and a pedestal, wherein the pedestal is located at the distal end of each arm, wherein the center base comprises a first portion and a second portion, wherein each of the first portion and the second portion comprises four pin holders, wherein the proximal end of each arm simultaneously fixedly and pivotably attaches to the center base by attaching to one pin and all of the arms lie within a plane, wherein each pin attaches to the center base by attaching to a pin holder, wherein at least two pin holders are closer to each other than they are to the remaining pin holders, wherein each arm is able to rotate about one pin from a radially outward position, relative to the center base, to a storage position, where at least two of the arms are aligned in the same general direction, and wherein the device is in its most compact position in the storage position.

2. The device of claim 1, wherein the length of a minor line joining the two pin holders that are closer to each other is shorter than the length of a major line joining the remaining two pin holders.

3. The device of claim 2, wherein the ratio of minor line to the major line ranges from 1:1.1 to 1:5.

4. The device of claim 1, wherein each of the first portion and the second portion comprises a dome-shaped portion.

5. The device of claim 1, wherein each pedestal comprises a seat and a corner.

6. The device of claim 5, wherein each seat or each corner, or both, are covered by a material with a great coefficient of friction than the coefficient of friction for the material that forms the device.

7. The device of claim 1, wherein each of the arms further comprises a floor contact portion, and wherein the floor contact portion is covered by a material with a greater coefficient of friction than the coefficient of friction for the material that forms the device.

8. A device for raising the height of a legged article of furniture, comprising four arms and a center base, wherein each arm comprises at least one tubular beam, a tension creating material, and a pedestal, wherein the pedestal is located at the distal end of each arm, wherein the center base comprises a first portion and a second portion, wherein each of the first portion and the second portion comprises a plurality of tubular materials, wherein each tubular material in the first portion connects with a corresponding tubular material in the second portion to form a pin, wherein the proximal end of each arm simultaneously fixedly and pivotably attaches to the center base by attaching to one pin and all of the arms lie within a plane, wherein at least two tubular materials in each of the first and the second portions are closer to each other than they are to the remaining tubular materials, wherein each arm is able to rotate about one pin from a radially outward position, relative to the center base, to a storage position, where at least two of the arms are aligned in the same general direction, and wherein the device is in its most compact position in the storage position.

9. A device for raising the height of a legged article of furniture, comprising four arms and a center base, wherein each arm comprises at least one tubular beam, a tension creating material, and a pedestal, wherein the pedestal is located at the distal end of each arm, wherein the center base comprises a first portion and a second portion, wherein at least one portion of the center base contacts a surface or hovers above the surface at a distance ranging from 1 mm to 4.5 cm, when the device is placed on a surface, wherein the proximal end of each arm simultaneously fixedly and pivotably attaches to the center base and all of the arms lie within a plane, wherein each arm is able to rotate from a radially outward position, relative to the center base, to a storage position, where at least two of the arms are aligned in the same general direction, and wherein the device is in its most compact position in the storage position.

10. The device of claim 9, wherein at least one portion of the center-base comprises a dome-shaped portion.

11. The device of claim 9, further comprising a plurality of pins, wherein the pins are formed by connecting two tubular materials together, wherein each of the tubular materials is attached to the center base.

* * * * *